United States Patent [19]

Frye-Hammelmann

[11] Patent Number: 5,694,976

[45] Date of Patent: Dec. 9, 1997

[54] EXTREMELY HIGH PRESSURE PUMP FOR DISTRIBUTING WATER TO SEVERAL APPLIANCES

[75] Inventor: Hermann Frye-Hammelmann, Oelde, Germany

[73] Assignee: Paul Hammelmann Maschinenfabrik GmbH, Oelde, Germany

[21] Appl. No.: 719,598

[22] Filed: Sep. 25, 1996

Related U.S. Application Data

[63] Continuation of Ser. No. 274,056, Jul. 12, 1994, abandoned.

[30] Foreign Application Priority Data

Jul. 27, 1993 [DE] Germany ............... 43 25 097.1

[51] Int. Cl.$^6$ ................................................. F16L 27/00
[52] U.S. Cl. ....................................... 137/580; 251/367
[58] Field of Search ............................. 137/580; 251/367

[56] References Cited

U.S. PATENT DOCUMENTS

| | | | |
|---|---|---|---|
| 543,008 | 7/1895 | Gale | 137/580 |
| 2,308,137 | 1/1943 | White | 137/580 |
| 2,485,692 | 10/1949 | Brill | 137/580 |
| 3,908,695 | 9/1975 | Dunbar | 137/580 |
| 5,269,345 | 12/1993 | Histand et al. | 137/580 |

FOREIGN PATENT DOCUMENTS

| | | | |
|---|---|---|---|
| 1035172 | 7/1958 | Germany . | |
| 2344190 | 3/1974 | Germany | 137/580 |

*Primary Examiner*—A. Michael Chambers
*Attorney, Agent, or Firm*—Sprung Kramer Schaefer & Briscoe

[57] ABSTRACT

A pump for distributing water at an extremely high-pressure to several appliances. Every appliance can connect and disconnect independently and has associated with it a device that diverts the water trapped in it when it disconnects. The object is to minimize wear in the water-diversion device. The device accommodates a constricted section in the form of an annular space that the water trapped in the appliance can escape through. Such pumps are employed for cleaning a wide range of articles.

6 Claims, 3 Drawing Sheets

EXTREMELY HIGH PRESSURE PUMP FOR DISTRIBUTING WATER TO SEVERAL APPLIANCES

This application is a continuation of application Ser. No. 08/274,056, filed Jul. 12, 1994 abandoned.

BACKGROUND OF THE INVENTION

The present invention concerns an extremely high-pressure pump for distributing water to several appliances. Every appliance can connect and disconnect independently. Associated with every appliance is a device that diverts the water trapped in it when it disconnects.

The trapped water has to be diverted because the pump has a limited output.

Devices for diverting water trapped in an appliance are known. They contain nozzles. The nozzles are subject to severe abrasion due to the high moment of the water being pumped through them at such pressures. The water leaving the nozzle rebounds off a surface, the face of a threaded bolt for example. Although a cushion of water is maintained upstream of the surface, it cannot prevent the massive and rapid jet from digging through the face of the bolt and into its shaft.

SUMMARY OF THE INVENTION

The object of the present invention is an extremely high-pressure pump of the aforesaid type, or more specifically a device for diverting the water trapped in the appliance the pump distributes water to, with parts that will essentially not wear out as rapidly.

This object is attained in accordance with the present invention in that the device accommodates a constricted section in the form of an annular space that the water trapped in the appliance can escape through.

The length of the annular space in one practical embodiment of the invention is variable, allowing adjustment of the constricted section to the prevailing system pressure and to how much water needs to be diverted.

The pressure it is subject to decreases as the water flows through the length of the annular space. The components of the device will accordingly last longer.

Further characteristics of the present invention are recited in the subsidiary claims.

The present invention will now be specified with reference to the drawing, wherein:

DETAILED DESCRIPTION OF THE INVENTION

Figure 1:
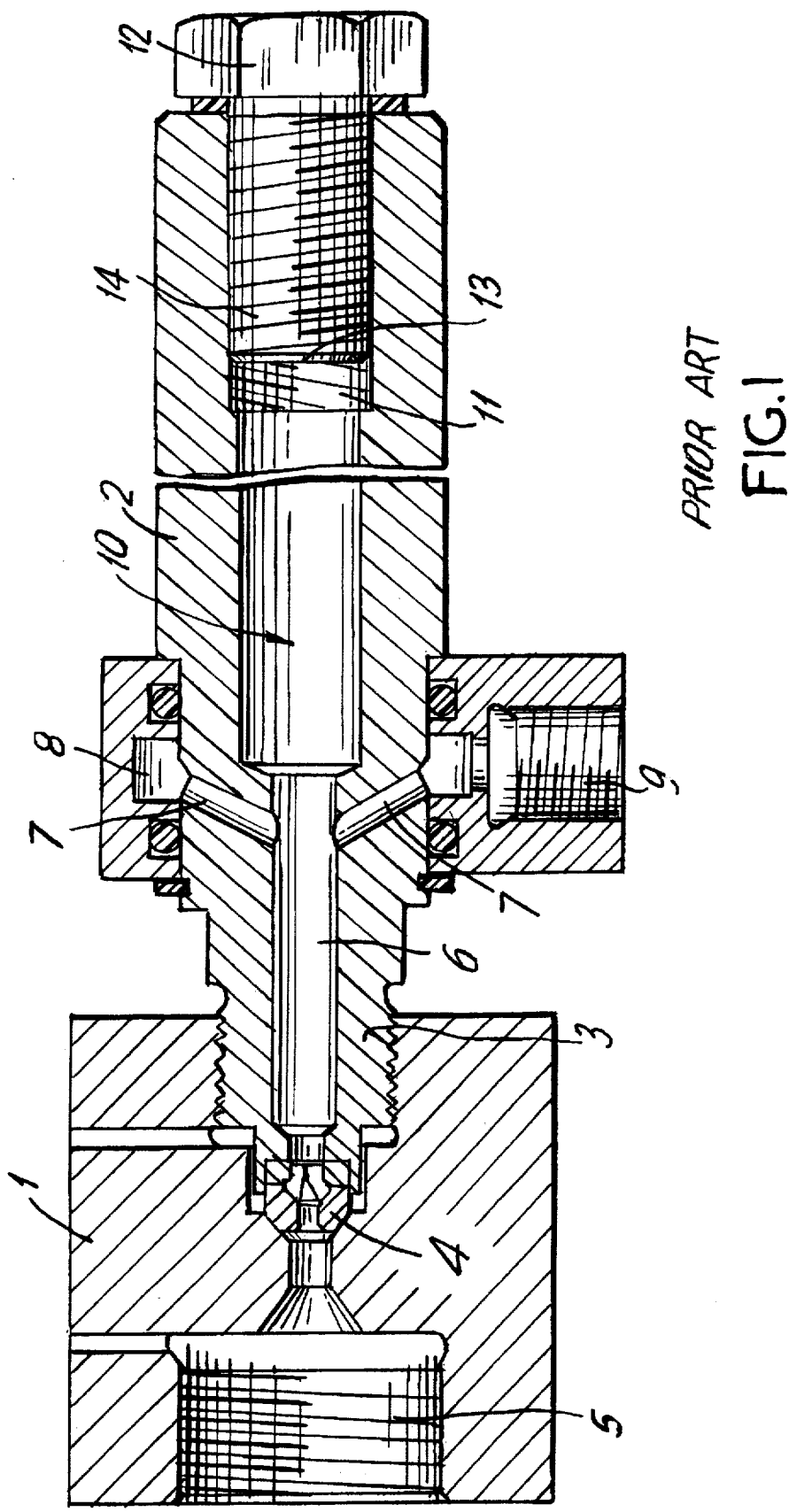
FIG. 1 illustrates a known device for diverting water trapped in an appliance.

The known device illustrated in FIG. 1 has a housing comprising two parts 1 and 2. Part 2 has a threaded section 3 that screws into a bore in part 1. Housing part 1 accommodates a nozzle 4. Any water trapped inside the associated appliance is conveyed out through nozzle 4 and a channel 5. This water, subject to high pressure, flows more rapidly through nozzle 4, which is accordingly subject to greater abrasion. The water leaving nozzle 4 enters a channel 6. Bores 7 diverge from channel 7 into an annular space 8, whence the water is diverted through a connection 9.

Channel 6 opens into a wider bore 10. The inner surface of the section 11 at the far end of bore 10 is threaded. A threaded bolt 12 is screwed into section 11. The water speeding through bore 10 rebounds off the face 13 of bolt 12 in spite of the protective cushion of water that forms upstream.

The water forced through nozzle 4 will as experience reveals dig through the face 13 of bolt 12 and into its shaft 14. The bolt will accordingly wear out rapidly.

Figure 2:
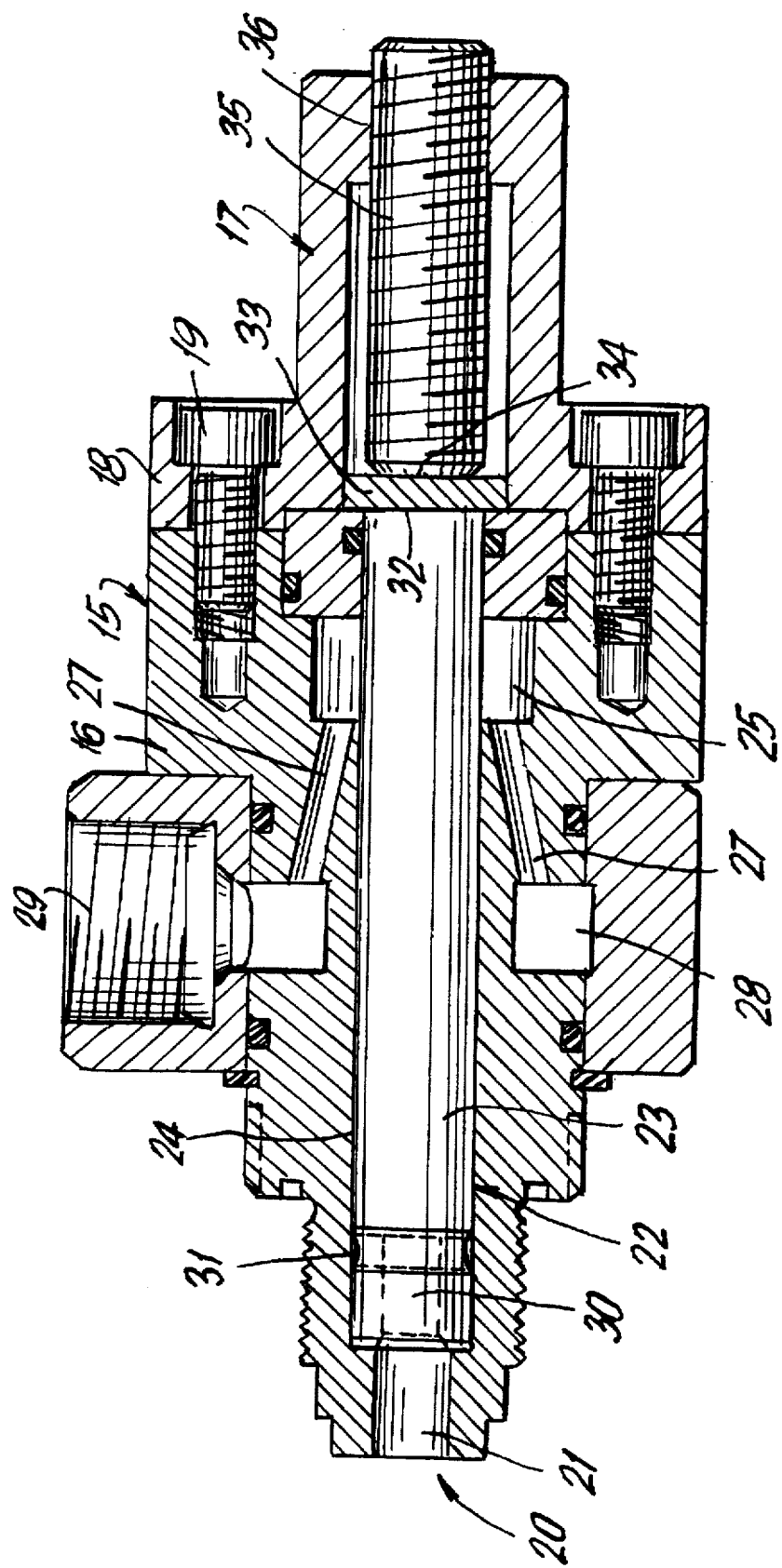
FIG. 2 is a longitudinal section through a device in accordance with the present invention.

FIG. 2 illustrates one embodiment of a device for diverting highly pressured water in accordance with the present invention.

The device consists of a housing 15. Housing 15 comprises two parts 16 and 17. Part 17 is secured to part 16 by a flange and screws 19. Housing part 16 is provided with a bore 20. Bore 20 comprises two sections 21 and 22. Upstream section 21 is the narrower and constitutes an intake for the incoming water.

Section 22 is the wider section and accommodates a displacement structure 23. Displacement structure 23 demarcates in conjunction with the inner surface of bore 20 an annular space 24. Annular space 24 opens into a chamber 25 that accommodates the water. The water leaving chamber 25 enters another annular space 28 through channels 27. From second annular space 28 the water is diverted out by way of an outlet 29.

The displacement structure 23 in the present embodiment extends through water-accommodation chamber 25. The structure's downstream face 32 rests against a spacer 33. Spacer 33 rests against the face 34 of a threaded bolt 35. Bolt 35 is screwed into a threaded bore 36 in housing part 17. By turning bolt 35 it is possible to vary the position of displacement structure 23 and hence the length of the constricted section represented by an annular space 24.

Figure 3:
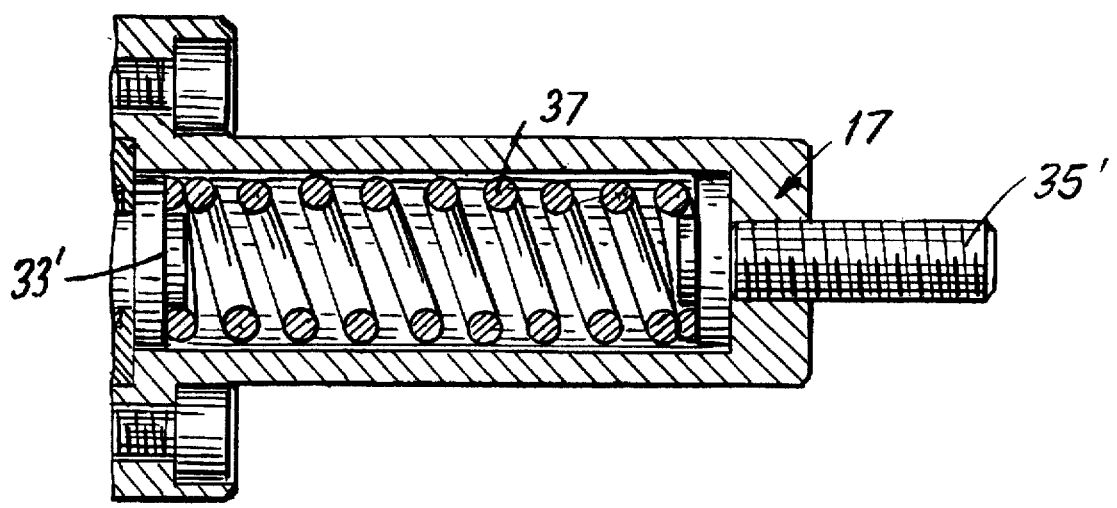
FIG. 3 is a longitudinal section though an alternative embodiment of the device in accordance with the present invention.

It is alternatively possible, shown in FIG. 3, to adjust the constricted section with a spring 37 that can be tensioned by bolt 35, and rests directly or indirectly against the upstream face 33 of displacement structure 23.

What is claimed is:

1. A diverting device for use in distributing water under high pressure to several appliances comprising: means for independently connecting and disconnecting an appliance; an intake for incoming water trapped in the appliance when disconnecting; and means for diverting the incoming water comprising means defining a constricted section comprising a first annular space through which the incoming water travels along a length thereof and means for varying the length of the first annular space; and an outlet for receiving water from the first annular space and wherein the means for diverting further comprises a housing comprising two parts, wherein a first part of the two parts is secured to a second part of the two parts with a flange and screws, wherein the second part has a first bore comprising two sections including a narrower upstream section and constituting the intake for incoming water and a wider downstream section, a displacement structure in the downstream section demarcating in conjunction with an inner surface of the bore the first annular space opening into a chamber receptive of water, and wherein water leaving the chamber enters a second annular space through channels and is diverted out by way of the outlet.

2. The device as in claim 1, further comprising a second bore in the upstream section and concentric with the water intake and in communication with an annular channel and wherein the first annular space diverges from the annular channel.

3. The device as in claim 2, wherein the displacement structure extends through the chamber with a downstream face resting against an adjustment mechanism.

4. The device as in claim 3, wherein the adjustment mechanism comprises a threaded bolt extending through a threaded bore in one part of the housing with a face resting against the displacement structure at least indirectly.

5. The device as in claim 3, wherein the adjustment mechanism comprises a spring that can be tensioned.

6. The device as in claim 3, wherein the portion of the housing accommodating the adjustment mechanism is flanged to the other part of the housing.

* * * * *